United States Patent [19]

Steinmueller

[11] 4,083,236

[45] Apr. 11, 1978

[54] LOAD CELL

[75] Inventor: Ralph E. Steinmueller, Detroit, Mich.

[73] Assignee: Harry W. Dietert Co., Detroit, Mich.

[21] Appl. No.: 745,930

[22] Filed: Nov. 29, 1976

[51] Int. Cl.² .................................................. G01L 1/04
[52] U.S. Cl. ................................... 73/141 A; 177/229
[58] Field of Search .............. 73/141 A; 177/229, 234

[56] References Cited

U.S. PATENT DOCUMENTS

| | | | |
|---|---|---|---|
| 1,159,416 | 11/1915 | Powers | 177/229 |
| 2,790,322 | 4/1957 | Grimes et al. | 73/141 A X |
| 2,934,946 | 5/1960 | Engquist | 73/139 |
| 3,371,526 | 3/1968 | Fathauer | 73/141 A |

FOREIGN PATENT DOCUMENTS 1,227,261  10/1966  Germany ........................... 73/141 A Primary Examiner—Charles A. Ruehl Attorney, Agent, or Firm—Whittemore, Hulbert & Belknap

[57] ABSTRACT

A load cell comprising a cantilever member constructed of a plurality of spaced apart elongated members, the spacing between which and the number of which may be varied to adjust the sensitivity of the load cell, means for applying a load to the free end of the cantilever member, means for stopping the cantilever member within the elastic limit thereof, indicator means for indicating the magnitude of the force in accordance with the deflection of the free end of the cantilever member with the force applied thereto which may be electrical in the form of a linear voltage differential transformer or mechanical in the form of a scale, and a pivoted indicator arm, the pivoting of which is produced by gravity and is limited by a pin movable in accordance with the deflection of the free end of the cantilever member, which pin is movable longitudinally of the cantilever member to adjust the calibration of the scale.

15 Claims, 4 Drawing Figures

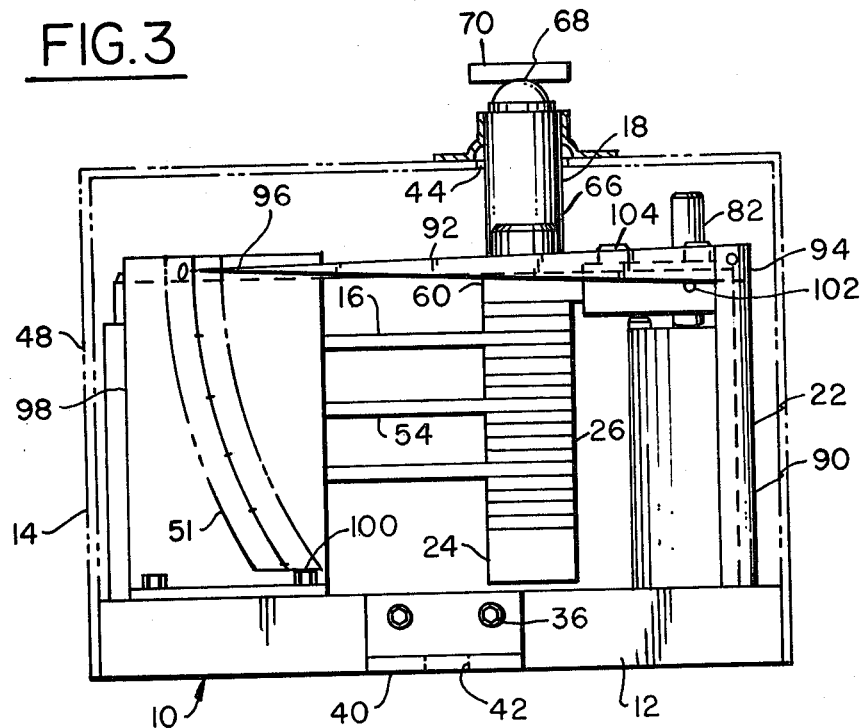
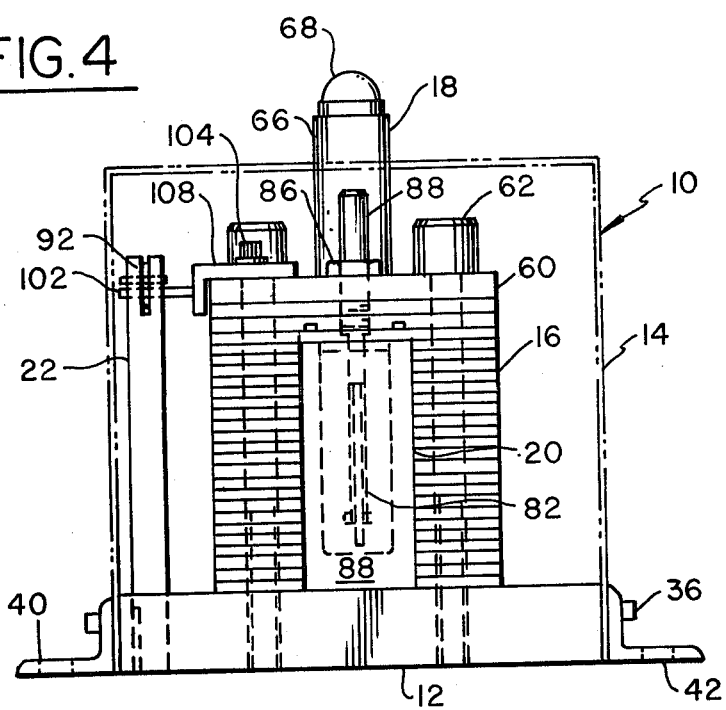

LOAD CELL

BACKGROUND OF THE INVENTION

1. Field of the Invention

The invention relates to load cells and refers more specifically to a load cell for providing an electrical or mechanical indication of a force applied thereto, which load cell is adjustable both as to cell sensitivity and indicator calibration.

2. Description of the Prior Art

In the past, load cells have included strain gauges connected to register the deflection, elongation or contraction of load cell members having a force applied thereto and to provide an indication of the force in accordance therewith. Also, force rings having strain gauges or linear voltage differential transformers connected thereto or thereacross have been known which provide an indication of deformation of the ring under load. Also, load cells of the scale type, including spring means and/or lever arrangements, for indicating a force applied thereto are relatively common.

All of these prior devices have particular limitations which are undesirable in certain applications. Thus, strain gauges must be permanently secured to a deformable member and because of their nature are subject to damage due to mechanical shock, improper adhesion, and the like. Force rings are limited in their application and are substantially incapable of sensitivity calibration as are strain gauge structures. Mechanical springs and leverage systems are generally inaccurate, extremely sensitive to hard use and sometimes are particularly complicated.

SUMMARY OF THE INVENTION

The invention comprises load cell structure including a base, a cantilever member including a plurality of elongated, spaced apart members secured together and connected to the base at one end with the other end thereof in spaced relation to the base, means for applying a force to be measured to the free end of the cantilever member to produce deflection thereof relative to the base in accordance with the force applied to the cantilever member, and both electrical and mechanical indicator structure for indicating the force applied to the load cell in accordance with the deflection of the free end of the cantilever member.

The deflection of the cantilever member is within the elastic limit of the spaced apart members thereof, the number and spacing of which determines the sensitivity of the load cell to a particular force. Both the spacing and the number of the longitudinally extending members may be varied.

The electrical indicating means of the load cell comprises a linear voltage differential transformer including core and coil, one of which is secured to the base so as to be rigid with respect to deflection of the free end of the cantilever member and the other of which is secured to the free end of the cantilever member.

The mechanical indicating structure includes an indicator arm pivotally mounted at one end and engaged at the one end with a pin secured to the end of the cantilever member whereby pivotal movement of the indicator arm is permitted only in accordance with the deflection of the free end of the cantilever member, and a scale associated with the free end of the indicator arm. The pin is positioned closer to the pivoted end of the indicator arm than the center of gravity thereof whereby the indicator arm is urged by gravity into engagement with the pin and the pin is movable longitudinally of the indicator arm for adjusting the calibration of the scale.

A positive stop is provided for the cantilever member within its elastic limit between the free end of the cantilever member and the base.

BRIEF DESCRIPTION OF THE DRAWINGS

FIG. 3 is an elevation view of the load cell of FIG. 1, taken substantially in the direction of arrow 3 in FIG. 1, showing the cover of the load cell in phantom.

FIG. 4 is an end view of the load cell of the invention, taken substantially in the direction of arrow 4 in FIG. 1, showing the cover of the load cell in phantom.

DESCRIPTION OF THE PREFERRED EMBODIMENT

Figure 1:
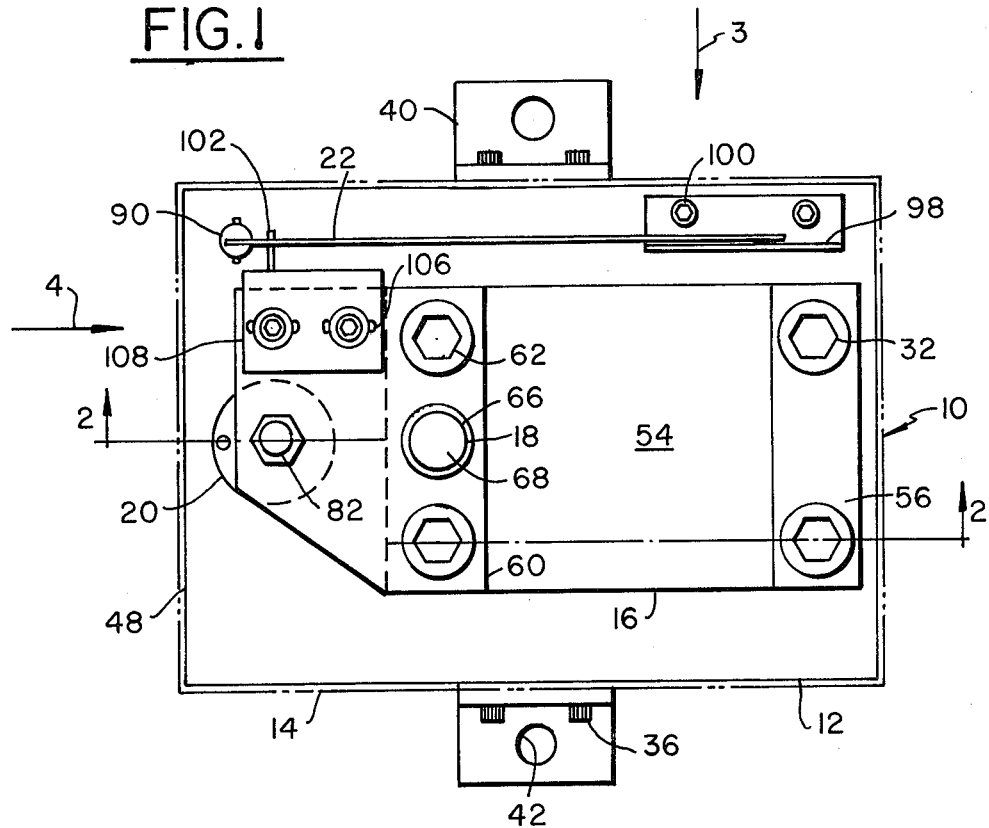
FIG. 1 is a top view of the load cell of the invention, with the cover of the load cell shown in phantom.

The load cell 10 includes a base 12, a cover 14, a cantilever member 16, means 18 for applying load to the load cell 10, and electrical and mechanical indicator means 20 and 22 for providing an indication of the force applied to the load cell 10 in accordance with deflection of the cantilever member 16.

The base 12 is a rectangular member which may be constructed of steel or the like and is of sufficient thickness to provide the required rigidity therefor. Tapped openings 28 and untapped openings 30 are provided in the base 12 as required to receive bolts 32, 34 and 36 and screws 38.

L-shaped brackets 40, shown best in FIG. 1, are secured to the base 12 by means of bolts 36. Brackets 40 are provided for mounting the base 12, as required, by means of bolts or the like extending through the openings 42 in the brackets 40.

The cover 14 is generally rectangular shaped, as shown, and is secured to the base by means of the screws 38. An opening 44 is provided in the top of the cover 14 through which the means for providing a force on the free end 26 of the cantilever member 16 extends, as shown best in FIG. 2. An opening 46 is provided in the end 48 of the cover 14 which is covered by an access plate 50 releasably secured to the cover 14 by convenient means such as screw 52. Access plate 50 permits access to adjustment of the electrical and mechanical indicating structures. The transparent window 51 is provided therein to permit viewing of the scale of the mechanical indicator means 22, as will be considered subsequently.

Figure 2:
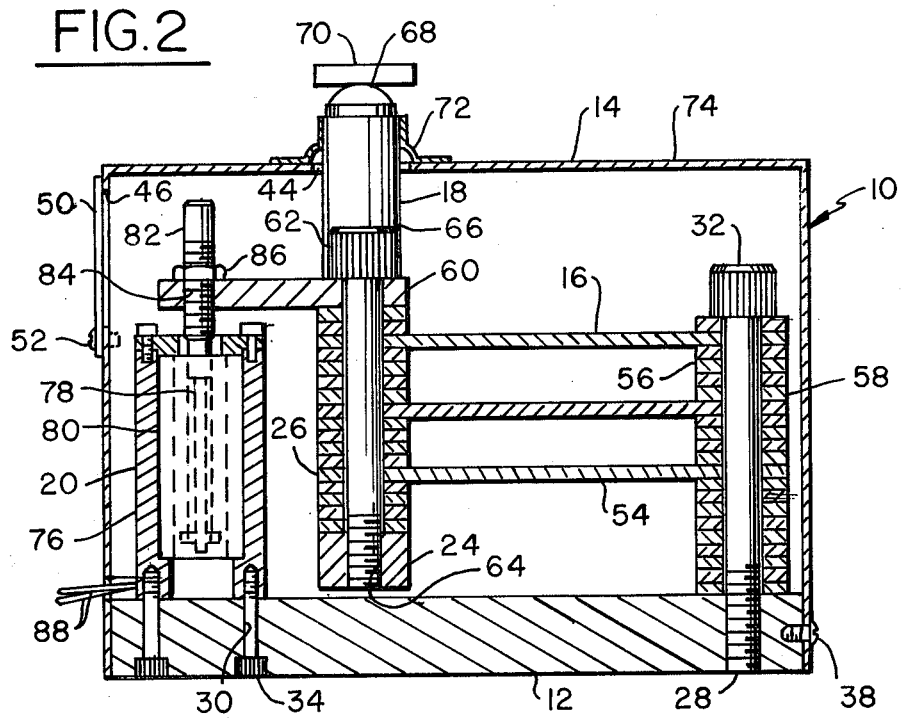
FIG. 2 is a section view of the load cell of FIG. 1, taken substantially on the line 2—2 in FIG. 1, with the cover of the load cell in place.

The cantilever member includes a plurality of separate elongated members 54 positioned in spaced apart relation with respect to each other by spacers 56 at both ends thereof. The spacers 56 and the elongated members 54 are rigidly secured at end 58 thereof to the base 12 by means of the bolts 32 extending into the threaded openings 28 in the base 12. A plate 60, shaped as shown best in FIGS. 1 and 2, is provided on the top of the spacers 56 at the free end 26 of the cantilever member, while a positive stop 24 is provided at the bottom of the free end of the cantilever member 16. The positive stop 24, spacers 56, elongated members 54, and plate 60 are all rigidly secured together at the free end of the cantilever member 16 by the bolts 62 extending into the threaded opening 64 in the positive stop 24.

The positive stop 24 limits the movement of the free end of the cantilever member 16 toward the base 12. The limited movement of the free end 26 of the cantilever member 16 prevents stress on the linear members 54 from straining them beyond their elastic limit during deflection of the cantilever member 16.

The structure 18 for applying a force to the load cell comprises a rigid cylinder 66 which may be secured to the plate 60 by convenient means such as bolts, welding or the like, not shown. The upper end 68 of the cylinder 66 is spherical, as shown best in FIG. 2, to provide a point contact for a force applied to the load cell 10 by means of, for example, a hardened plate 70 (not part of the invention). A flexible boot 72, which may, for example, be constructed of rubber, is secured adjacent the top of the cylinder 66 and to the top 74 of the cover 14 around the opening 44 therein.

The electrical indicator means 20, again as shown best in FIG. 2, includes a linear voltage differential transformer 76 including a core 78 and a coil 80. The coil 80 is secured to the base 12 by the bolts 34, while the core 78 is adjustably secured to the plate 60 by means of the screw 82 in the threaded opening 84 in the plate 60. The position of the core 78 in the coil 80 may be adjusted by adjustment of the screw 82 and locked in adjusted position by means of the lock nut 86, accessible through the access plate 50.

Terminals of the linear voltage differential transformer may be connected to an indicator meter through convenient electrical wiring 88 which may be passed into the cover 14, as desired.

The mechanical indicator means 22, as shown best in FIGS. 1 and 3, includes a post 90 which may be secured to the base 12 by convenient means such as a bolt (not shown), an indicator arm 92 pivotally connected to the post 90 at end 94, as shown in FIG. 3, and having a free end 96. The mechanical indicator structure 22 further includes the scale 98 which may be viewed through the transparent window 51 in the cover 74, as previously indicated. The scale 98 is secured to the base 12 by convenient means such as the bolts 100. The mechanical indicator means 22 is completed by a pin 102 adjustably secured to the plate 60 by the bolts 104 extending into the plate 60 through the slots 106 in the L-shaped bracket 108 to which the pin 102 is rigidly secured by convenient means such as a threaded opening in the bracket (not shown), which bolts are again accessible from the access plate 60 to adjust the pin 102 longitudinally of the indicator arm 92.

In overall operation of the load cell of the invention, the range of use of the load cell is determined so that the number of separate elongated members 54 and the number and positioning of the spacers 56 between the elongated members 54 is first accomplished. Thus, the load range of the load cell is determined by the number and spacing of the members 54. With the sensitivity of the load cell thus determined, a load is placed on the cylinder 18 through convenient means such as plate 70 to deflect the free end 26 of the cantilever member 16.

In deflection of the free end of the cantilever member 16, the separate elongated members 54 act as though both ends thereof are fixed while vertical deflection between the ends takes place. The resistance of the cantilever member to bending due to a load applied to the free end thereof is increased as compared to simple cantilever structure wherein one end of each of the separate members 54 are free rather than held in fixed relation to the same end of the other members 54.

Deflection of the end 26 of the member 16 is recorded as movement between the core 78 and coil 80 of the linear voltage differential transformer 76 in terms of the force applied to the means 18 causing the deflection of the end 26 of the cantilever member 16.

At the same time as the free end 26 of the cantilever member 16 deflects, the pin 102 rigidly secured thereto is deflected downward, whereby the indicator arm 92 is permitted to pivot counterclockwise, as shown in FIG. 3, to cause a substantial movement of the free end 96 thereof over the scale 98 and thus provide an indication of the force applied to the load cell, causing the deflection of the cantilever member 16.

The pin 102 is adjustable as considered above longitudinally of the cantilever member 16 through the access plate 50 to adjust the calibration of the mechanical indicator structure 22 just as the screw 82 is adjustable to calibrate the linear voltage differential transformer.

Should the load applied to the load cell be larger than expected, the positive stop 24 will contact the base 12 and prevent further deflection of the cantilever member 16. Permanent deformation of the separate elongated members 54 is thus prevented.

While one embodiment of the invention has been considered in detail, it will be understood that other embodiments and modifications thereof are contemplated. It is the intention to include within the scope of the invention all such embodiments and modifications as are defined by the appended claims.

What I claim as my invention is:

1. A load cell for providing an indication of the magnitude of a load applied thereto, comprising a cantilever member having a free end which deflects in accordance with the weight applied thereto, including a plurality of separate spaced apart elongated members extending longitudinally of the cantilever member and means for varying the number of separate elongated members in the cantilever member whereby deflection of the free end of the cantilever member in response to a predetermined weight is varied, and meand for indicating the deflection of the free end of the cantilever member as force applied to the free end thereof.

2. Structure as set forth in claim 1 wherein the means for indicating the deflection of the cantilever member is electrical and includes a linear voltage differential transformer having a relatively movable core and coil, one of which is mounted stationary with respect to the free end of the cantilever member and the other of which is secured to the free end of the cantilever member.

3. Structure as set forth in claim 1 wherein the means for indicating the deflection of the cantilever member is mechanical and includes a pivotally mounted indicator arm having a free end, means limiting movement of the free end of the indicator arm in accordance with the deflection of the free end of the cantilever member and a scale operably associated with the free end of the indicator arm.

4. Structure as set forth in claim 3 wherein the means limiting movement of the free end of the indicator arm in accordance with the deflection of the free end of the cantilever member comprises a pin secured to the free end of the cantilever member for movement therewith and engaged with the indicator arm, and means urging the indicator arm into engagement with the pin.

5. Structure as set forth in claim 4 wherein the pin engages the indicator arm closer to the pivotal mounting of the indicator arm than the center of gravity of the indicator arm whereby the means urging the indicator arm into engagement with the pin is gravity.

6. Structure as set forth in claim 4 wherein the pin is adjustable longitudinally of the indicator arm.

7. Structure as set forth in claim 1 and further including means for varying the spacing of the separate elongated members in the cantilevered member whereby deflection of the free end of the cantilever member in response to a predetermined weight is varied.

8. Structure as set forth in claim 1 and further including means engaging the free end of the cantilever member to provide a positive stop of the deflection of the free end of the cantilever member within the elastic limit of the separate elongated members.

9. A load cell for providing an indication of the magnitude of a load applied thereto, comprising a cantilever member having a free end which deflects in accordance with the weight applied thereto, including a plurality of separate spaced apart elongated members extending longitudinally of the cantilever member and means for varying the spacing of the separate elongated members in the cantilever member whereby deflection of the free end of the cantilever member in response to a predetermined weight is varied, and means for indicating the deflection of the free end of the cantilever member as force applied to the free end thereof.

10. Structure as set forth in claim 9 wherein the means for indicating the deflection of the cantilever member is electrical and includes a linear voltage differential transformer having a relatively movable core and coil, one of which is mounted stationary with respect to the free end of the cantilever member and the other of which is secured to the free end of the cantilever member.

11. Structure as set forth in claim 9 wherein the means for indicating the deflection of the cantilever member is mechanical and includes a pivotally mounted indicator arm having a free end, means limiting movement of the free end of the indicator arm in accordance with the deflection of the free end of the cantilever member and a scale operably associated with the free end of the indicator arm.

12. Structure as set forth in claim 11 wherein the means limiting movement of the free end of the indicator arm in accordance with the deflection of the free end of the cantilever member comprises a pin secured to the free end of the cantilever member for movement therewith and engaged with the indicator arm, and means urging the indicator arm into engagement with the pin.

13. Structure as set forth in claim 12 wherein the pin engages the indicator arm closer to the pivotal mounting of the indicator arm than the center of gravity of the indicator arm whereby the means urging the indicator arm into engagement with the pin is gravity.

14. Structure as set forth in claim 12 wherein the pin is adjustable longitudinally of the indicator arm.

15. Structure as set forth in claim 9 and further including means engaging the free end of the cantilever member to provide a positive stop of the deflection of the free end of the cantilever member within the elastic limit of the separate elongated members.

* * * * *